(12) United States Patent
Tzeng

(10) Patent No.: US 6,678,272 B1
(45) Date of Patent: Jan. 13, 2004

(54) APPARATUS AND METHOD USING A REGISTER SCHEME FOR EFFICIENT EVALUATION OF EQUATIONS IN A NETWORK SWITCH

(75) Inventor: Shr-jie Tzeng, Fremont, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/577,321

(22) Filed: May 24, 2000

(51) Int. Cl.[7] .............................................. H04L 12/56
(52) U.S. Cl. ...................................... 370/392; 370/400
(58) Field of Search ................................ 370/389, 392, 370/400, 401, 402, 403, 404, 405, 406

(56) References Cited

U.S. PATENT DOCUMENTS

| 5,953,335 | A | | 9/1999 | Erimli et al. | |
|---|---|---|---|---|---|
| 6,424,650 | B1 | * | 7/2002 | Yang et al. | .................. 370/390 |
| 6,571,291 | B1 | * | 5/2003 | Chow | .......................... 709/230 |
| 6,574,240 | B1 | * | 6/2003 | Tzeng | ......................... 370/469 |

* cited by examiner

Primary Examiner—Chau Nguyen
Assistant Examiner—Andrew Wahba
(74) Attorney, Agent, or Firm—Manelli Denison & Selter PLLC; Leon R. Turkevich

(57) ABSTRACT

A network switch, configured for performing layer 2 and layer 3 switching in an Ethernet (IEEE 802.3) network includes a network switch port having a filter configured for evaluating an incoming data packet. The filter includes a min term memory configured for storing min term values. Each min term value is stored based on a location of a corresponding selected byte of the incoming data packet for comparison. Each min term is stored as a table entry having an expression portion specifying a corresponding comparison operation and a template identifier field that specifies templates that use the corresponding min term. The template identifier field includes an equation identifier. A min term generator is configured for simultaneously comparing a received byte of the incoming data packet with the min terms that correspond to the received byte and generates respective min term comparison results. An equation core is configured for evaluating equations and generates a frame tag identifying the incoming data packet based on the min term comparison results relative to the templates. The equation core is configured to identify equations which are no longer relevant. An equation reduction module includes a plurality of register arrays. Each register array includes equation identifiers corresponding to the corresponding byte. The equation reduction module includes logic configured to compare the equation identifiers of equations which are no longer relevant to equation identifiers in the register arrays and based on the comparison, to set vectors. A min term controller is configured to read the vectors and based thereon, to send necessary min terms to the min term generator.

14 Claims, 7 Drawing Sheets

APPARATUS AND METHOD USING A REGISTER SCHEME FOR EFFICIENT EVALUATION OF EQUATIONS IN A NETWORK SWITCH

BACKGROUND OF THE INVENTION

1. Field of the Invention

The present invention relates to layer 2 (and above) switching of data packets in a non-blocking network switch configured for switching data packets between subnetworks and more particularly to the efficient evaluation of equations at a network switch port.

2. Background Art

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of data packets. The full-duplex media access mechanism provides a two-way, point-to-point communication link between two network elements, for example between a network node and a switched hub.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received data packet may include a VLAN (virtual LAN) tagged frame according to IEEE 802.1 q protocol that specifies another subnetwork (via a router) or a prescribed group of stations. Since the switching occurs at the layer 2 level, a router is typically necessary to transfer the data packet between subnetworks.

Efforts to enhance the switching performance of a network switch to include layer 3 (e.g., Internet protocol) processing may suffer serious drawbacks, as current layer 2 switches preferably are configured for operating in a non-blocking mode, where data packets can be output from the switch at the same rate that the data packets are received. Newer designs are needed to ensure that higher speed switches can provide both layer 2 and above switching capabilities for faster speed networks such as 100 Mbps or gigabit networks.

However, such design requirements risk loss of the non-blocking features of the network switch, as it becomes increasingly difficult for the switching fabric of a network switch to be able to perform layer 3 processing at the wire rates (i.e., the network data rate).

Commonly assigned U.S. patent application Ser. No. 09/430,753, filed Oct. 29, 1999 and entitled "Apparatus And Method For Identifying Data Packet Types In Real Time On A Network Port Switch" discloses one arrangement that enables a network switch port to provide layer 2 and above switching capabilities. In these disclosed arrangement, equations are evaluated in a network switch port based on min term comparisons to generate a tag which identifies the incoming data packet, as well as the action that needs to be performed by the network switch port. For example, assume the following equation is evaluated:

$$EQ1 = M1*M2*M3*M4 + M1*M5*M6*M7$$

Where $M1 = $ IPv4 frame//byte $(0) == 8'hx4$ $M2 = $ protocol field is TCP $M3 \ldots$ In conventional arrangements, the equation EQ1 is evaluated by comparing each of the min terms M1, M2, M3 ... If the comparison for each min term is a true condition, then the end condition is matched in EQ1 causing a tag to be generated which corresponds to the condition specific for EQ1. Although this equation evaluation technique is effective, conventional implementation techniques may cause unnecessary computations to be performed on the equation. For example, in EQ1, if the incoming frame is not a IPv4 frame, this equation is deemed false after evaluation of the min term M1 with the first byte. Thus, the continued evaluation of min terms M2, M3 ... M7 wastes resources, reducing the computing efficiency in the network switch port.

SUMMARY OF THE INVENTION

There is a need for an arrangement that enables a network switch to provide layer 2 switching and layer 3 switching capabilities for 100 Mbps and gigabit links without blocking of the data packets.

There is also a need for an arrangement that improves the evaluation of equations so that once the result of the equation is know, no further computations are performed on the equation.

These and other needs are attained by the present invention, where a network switch includes a filter having a min term memory configured for storing min term values. Each min term value is stored based on a location of a corresponding selected byte of the incoming data packet for comparison. Each min term is stored as a table entry having an expression portion specifying a corresponding comparison operation and a template identifier field that specifies templates that use the corresponding min term. The template identifier field includes an equation identifier. A min term generator is configured for simultaneously comparing a received byte of the incoming data packet with the min terms that correspond to the received byte and generates respective min term comparison results. An equation core is configured for evaluating equations and generates a frame tag identifying the incoming data packet based on the min term comparison results relative to the templates. The equation core is configured to identify equations which are no longer relevant. An equation reduction module includes a plurality of register arrays. Each register array includes equation identifiers corresponding to the corresponding byte. The equation reduction module includes logic configured to compare the equation identifiers of equations which are no longer relevant to equation identifiers in the register arrays and based on the comparison, to set vectors. A min term controller is configured to read the vectors and based thereon, to send necessary min terms to the min term generator.

One aspect of the present invention provides a method, in a network switch, of evaluating an incoming data packet at a network switch port. The method includes of evaluating an incoming data packet at a network switch port. The method includes storing a plurality of templates for equations configured for identifying respective data formats. Each template has at least one min term configured for comparing a corresponding prescribed value to a corresponding selected byte of the incoming data packet. Min terms that correspond to the selected byte are simultaneously compared to the selected byte as the selected byte is received by the network switch port. An obsolete equation which needs no further evaluation is identified based on a comparison of the min terms with the selected byte. Equation identifier information corresponding to min terms which are necessary to be compared with a respective byte are stored in a register array corresponding with each byte. The equation identifier of the obsolete equation is compared with the equation identifier information in each register array and based on the comparison, equations which need no further evaluation are identified.

Thus, the apparatus and method if the invention advantageously reduces the processing of equations by not evaluating equations which are determined to be obsolete.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

Figure 1:
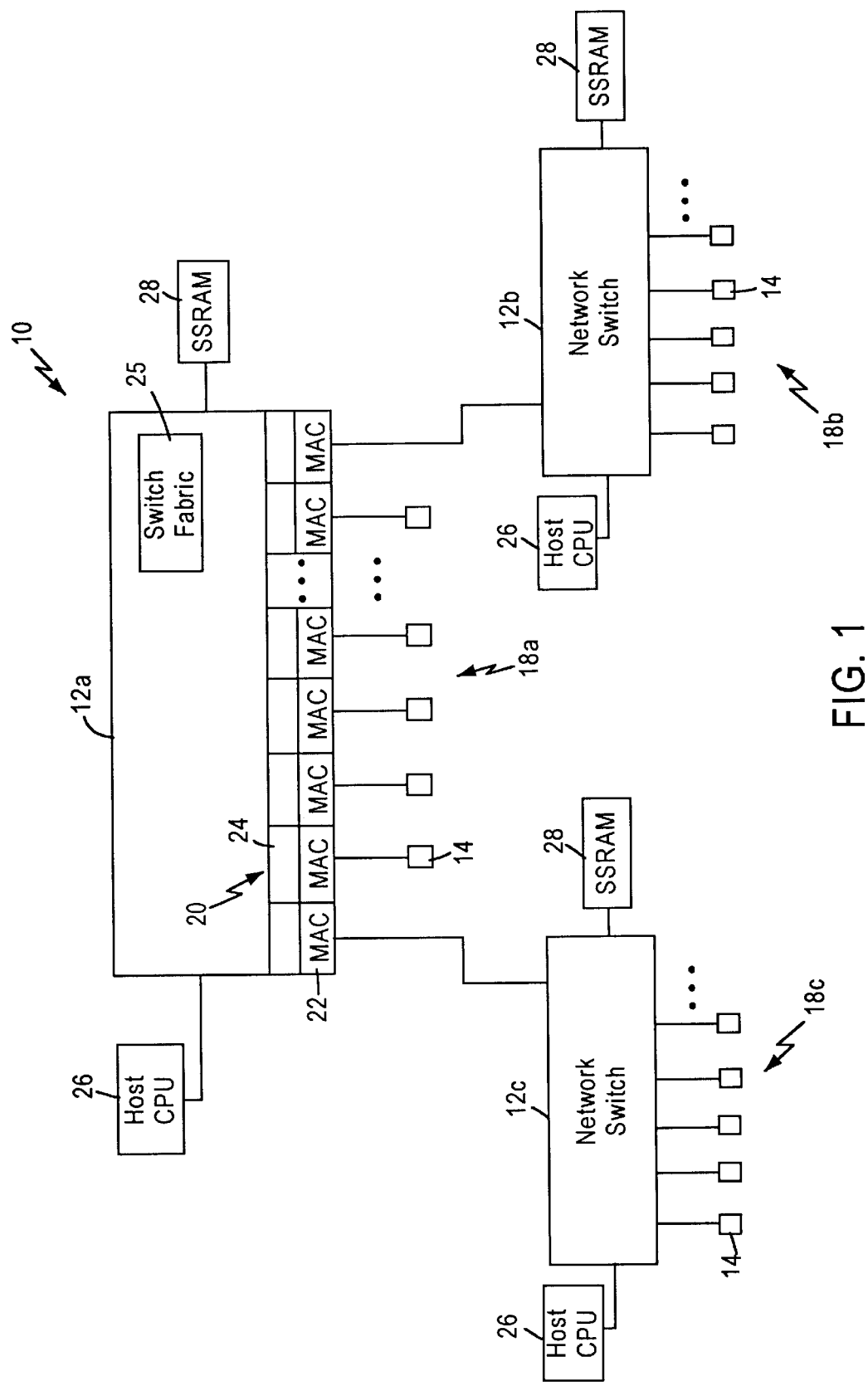
FIG. 1 is a block diagram of a packet switched network including multiple network switches for switching data packets between respective subnetworks according to an embodiment of the present invention.

FIG. 1 is a block diagram illustrating a packet switched network 10, such as an Ethernet (IEEE 802.3) network. The packet switched network includes integrated (i.e., single chip) multiport switches 12 that enable communication of data packets between network stations 14. Each network station 14, for example a client workstation, is typically configured for sending and receiving data packets at 10 Mbps or 100 Mbps according to IEEE 802.3 protocol. Each of the integrated multiport switches 12 are interconnected by gigabit Ethernet links 16, enabling transfer of data packets between subnetworks 18a, 18b, and 18c. Hence, each subnetwork includes a switch 12, and an associated group of network stations 14.

Each switch 12 includes a switch port 20 that includes a media access control (MAC) module 22 and a packet classifier module 24. The MAC module 20 transmits and receives data packets to the associated network stations 14 across 10/100 Mbps physical layer (PHY) transceivers (not shown) according to IEEE 802.3u protocol. Each switch 12 also includes a switch fabric 25 configured for making frame forwarding decisions for received data packets. In particular, the switch fabric 25 is configured for layer 2 switching decisions based on source address, destination address, and VLAN information within the Ethernet (IEEE 802.3) header; the switch fabric 25 is also configured for selective layer 3 switching decisions based on evaluation of an IP data packet within the Ethernet packet.

As shown in FIG. 1, each switch 12 has an associated host CPU 26 and a buffer memory 28, for example an SSRAM. The host CPU 26 controls the overall operations of the corresponding switch 12, including programming of the switch fabric 25. The buffer memory 28 is used by the corresponding switch 12 to store data frames while the switch fabric 25 is processing forwarding decisions for the received data packets.

As described above, the switch fabric 25 is configured for performing layer 2 switching decisions and layer 3 switching decisions. The availability of layer 3 switching decisions may be particularly effective if an end station 14 within subnetwork 18a wishes to send an e-mail message to selected network stations in subnetwork 18b, 18c, or both; if only layer 2 switching decisions were available, the switch fabric 25 of switch 12a would need to send the e-mail message to a router (not shown), which would introduce additional delay. Use of layer 3 switching decisions by the switch fabric 25 enables the switch fabric 25 to make intelligent decisions as far as how to handle a packet, including advanced forwarding decisions, and whether a packet should be considered a high-priority packet for latency-sensitive applications, such as video or voice.

Figure 2:
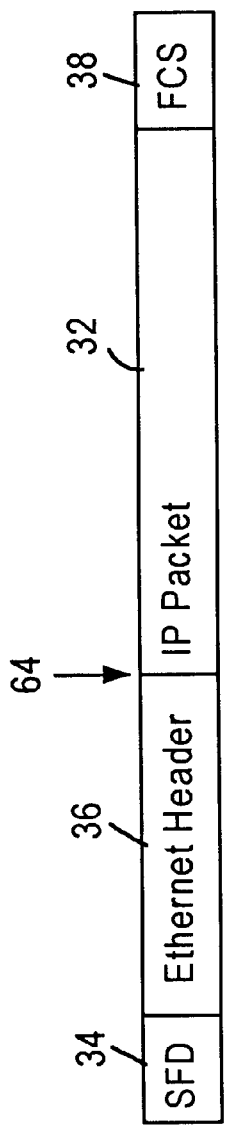
FIG. 2 is a diagram illustrating a conventional layer 2 Ethernet-type data packet carrying a layer three Internet Protocol (IP) packet.

FIG. 2 is a diagram illustrating an Ethernet (IEEE 802.3) packet 30 carrying an IP packet 32 as payload data. Specifically, the Ethernet packet 30 includes a start frame delimiter (SFD) 34, an Ethernet header 36, the IP packet 32, and a cyclic redundancy check (CRC) or frame check sequence (FCS) field 38. Hence, a switch fabric 25 configured for layer 3 switching decisions needs to be able to quickly process the IP packet 32 within the received Ethernet frame 30 to avoid blocking of the frame within the switch.

According to the disclosed embodiment, the packet classifier module 24 of FIG. 1 is configured for multiple simultaneous comparisons between the incoming data stream and templates that identify the data format of the incoming data stream. Specifically, users of the host processor 26 will specify policies that define how data packets having certain IP protocols should be handled by the switch fabric 25. These policies are implemented by loading into the switch fabric 25 a set of frame forwarding decisions for each corresponding IP protocol type. Hence, the switch fabric 25 could include one set of frame forwarding instructions for an HTTP packet, another set of frame forwarding instructions for an SNMP packet, and another set of frame forwarding instructions for a high-priority packet (e.g., video, or voice, etc.).

Figure 3:
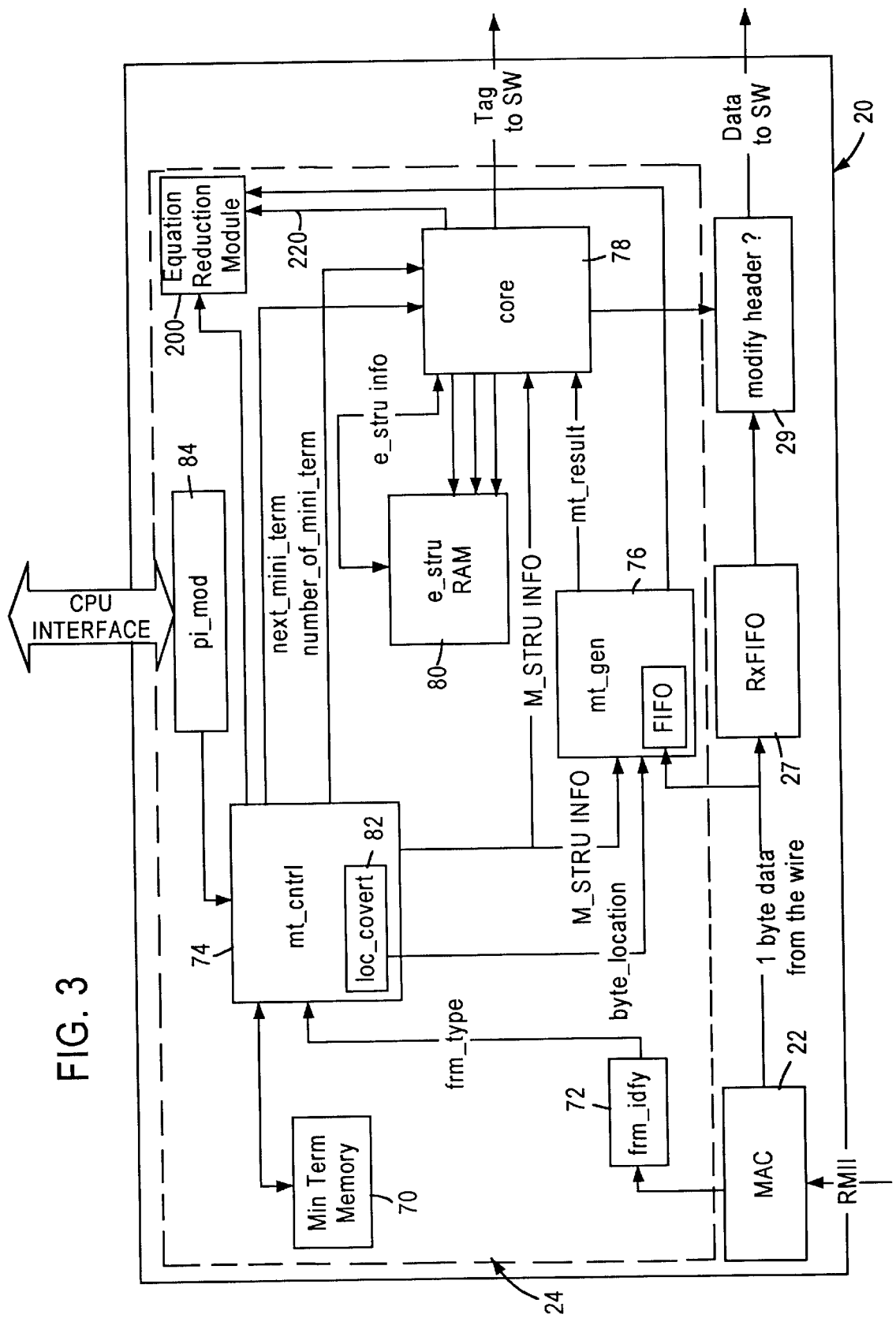
FIG. 3 is a block diagram illustrating a network switch port of FIG. 1, according to an embodiment of the present invention.

FIG. 3 is a block diagram illustrating a packet classifier module 24 of a network switch port 20 shown in accordance with the invention. As shown, the network switch port 20 includes a MAC 22, a receive FIFO buffer 27, a header modifier 29, and the packet classifier module 24. The packet classifier module 24, also referred to as a network switch port filter, is configured for identifying (i.e., evaluating) the incoming data packet at the network switch port 20, and supplying to the switch fabric 25 a tag that specifies the action to be performed on the data packet based on type of data packet being received. Specifically, the packet classifier module 24 simultaneously compares the incoming data packet with a plurality of templates configured for identifying respective data formats. The packet classifier module 24, based on the comparison between the incoming data packet and the plurality of templates, identifies an equation to be executed that specifies the tag to be supplied to the switch fabric 25.

Specifically, the packet classifier module 24 generates a comparison result that identifies the incoming data packet by detecting at least one matched template from a plurality of templates. The packet classifier module 24 then identifies which of the equations includes the matched template, and generates the tag specified by the equation.

Figure 4A:
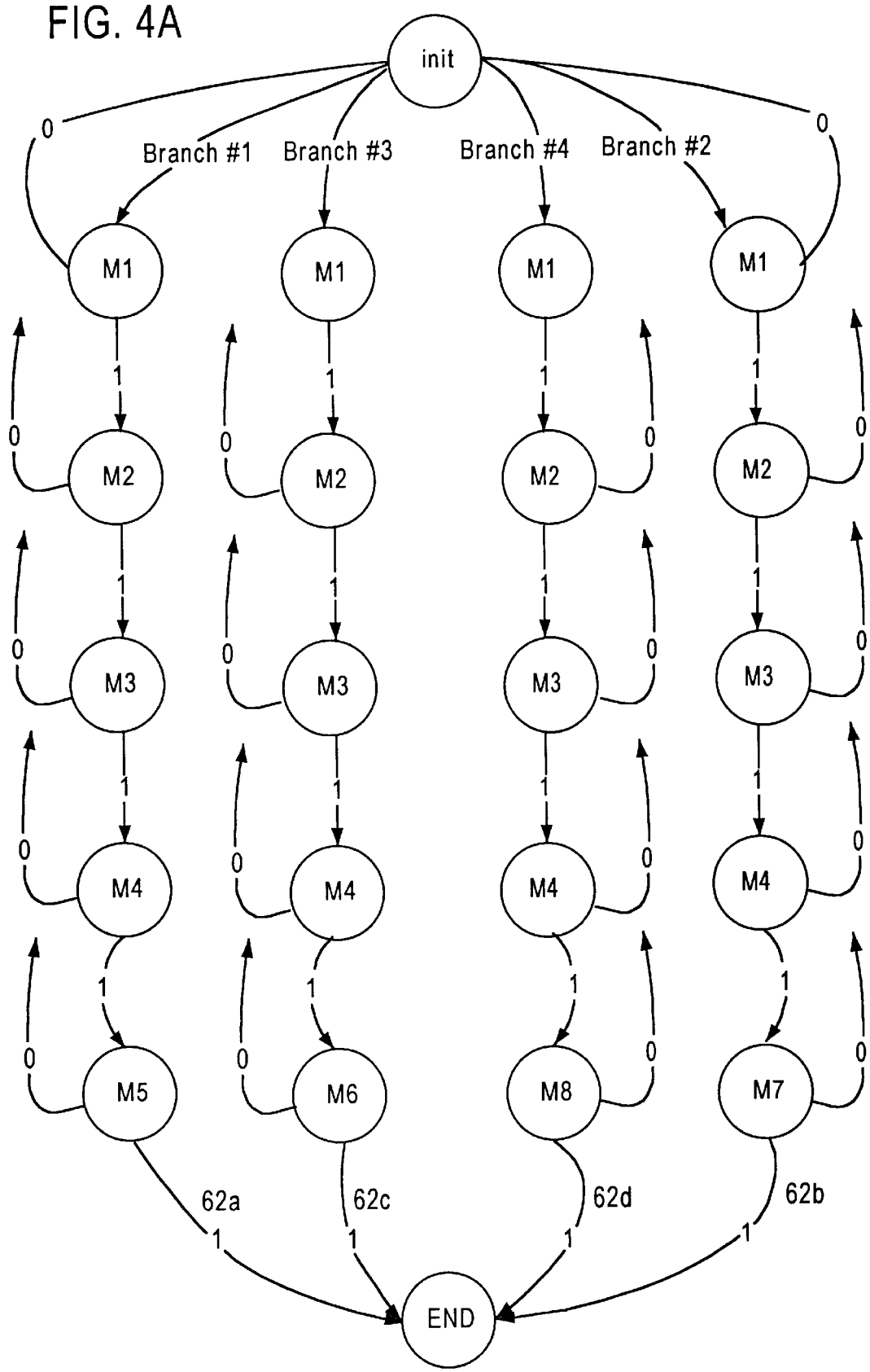
FIGS. 4A and 4B are each a diagram illustrating simultaneous processing of two templates of an equation by the min term generator of FIG. 3.
Figure 4B:
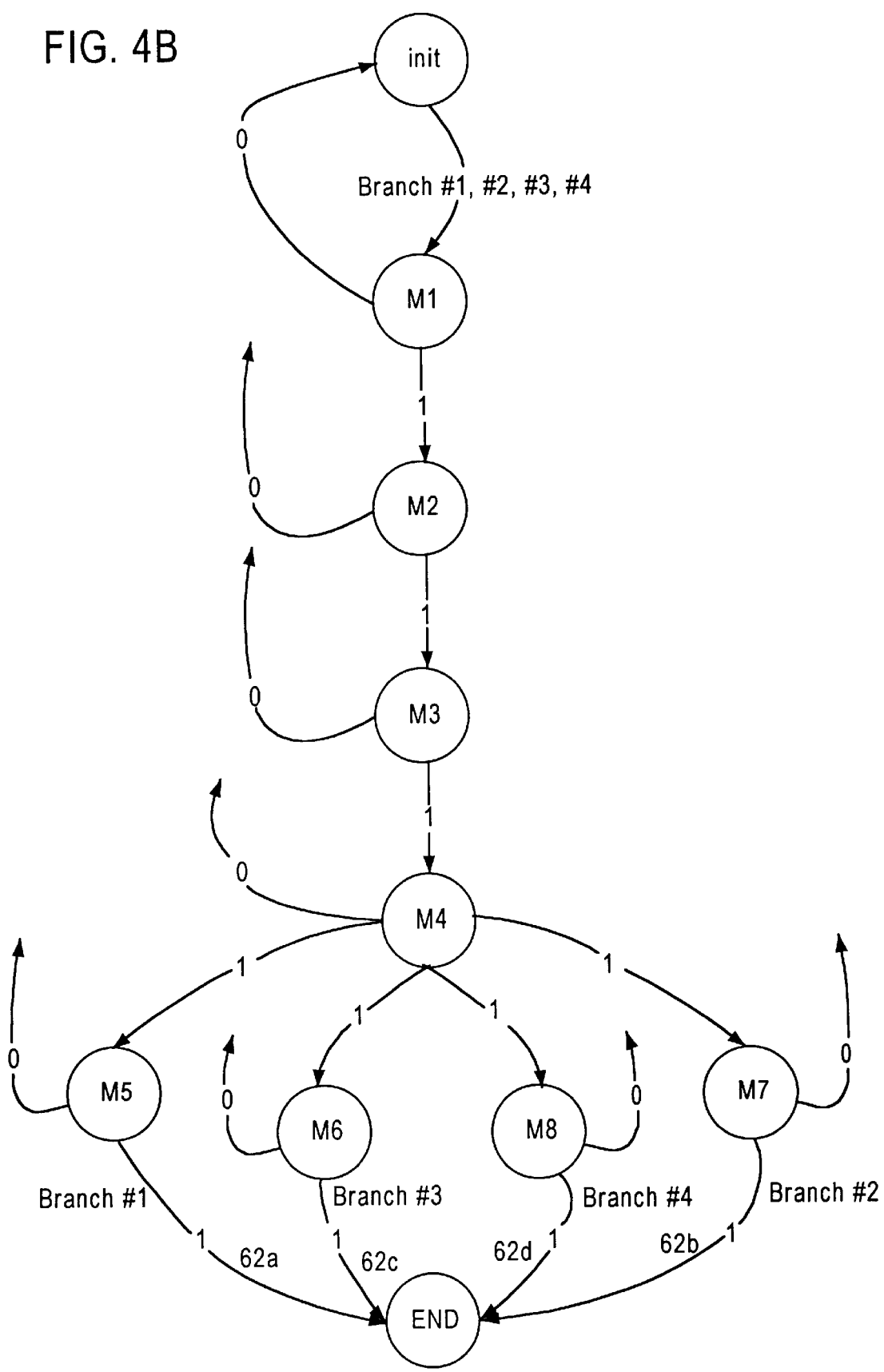

FIGS. 4A and 4B are diagrams illustrating the simultaneous processing of two templates of an equation by the packet classifier module 24. FIG. 4A illustrates the logical evaluation by the packet classifier module 24 of the equation:

$$Eq1=M1*M2*M3*M4*(M5+M6+M7+M8).$$

FIG. 4B illustrates how the equation Eq1 would actually be stored in the central min term memory 71. The equation Eq1 includes four templates 62a, 62b, 62c, and 62d: the template 62a includes the min terms M1, M2, M3, M4, and M5; the template 62b includes the min terms M1, M2, M3, M4, and M6; the template 62c includes the min terms M1, M2, M3, M4, and M7; and the template 62d includes the min terms M1, M2, M3, M4, and M8. Each template 62 corresponds to a specific IP data format recognizable based on the header of the IP data packet 32. For example, templates 62a and 62c may be configured for identifying an HTTP packet, and templates 62b and 62d be may be configured for identifying an SNMP packet. Specifically, an HTTP packet is identified if it is in IPv4 format, the time to live field in IP is bigger than one, the protocol field in IP header is TCP, header checksum is correct, source TCP port is 80 or destination TCP port is 80. An SNMP packet is identified if it is in IPv4 format, the time to live field in IP is bigger than one, the protocol field in IP header is TCP, header checksum is correct, source TCP port is 25 or destination TCP port is 25.

Hence, the following min terms may be established to represent all the above-described criteria:

M1=packet is in IPv4 format
M2=time to live field in IP is bigger than one
M3=protocol field in IP header is TCP
M4=header checksum is correct
M5=source TCP port is 80
M6=destination TCP port is 80
M7=source TCP port is 25
M8=destination TCP port is 25

Hence, the templates 62a and 62c identify HTTP packets, and the templates 62b and 62d identify SNMP packets. Thus, equation one (Eq1) specifies that a specific result (e.g., the tag having a specified value) should be output to the switch fabric 25 if either template 62a, 62b, 62c, or 62d are true.

Figure 5:
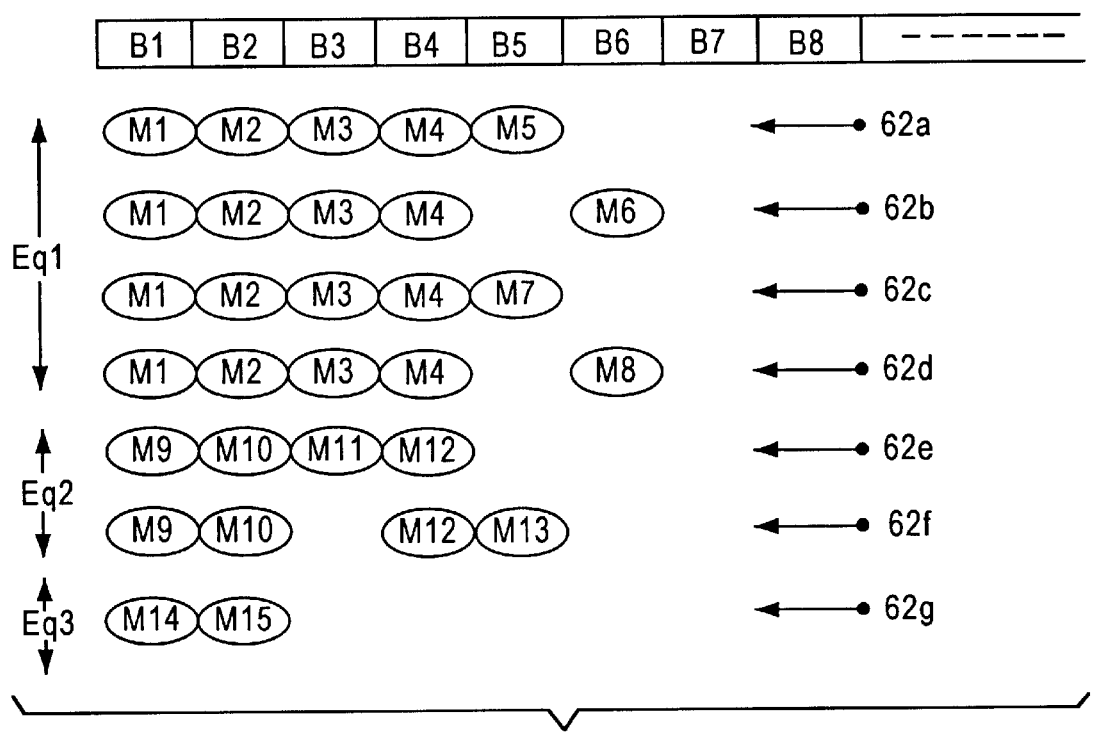
FIG. 5 is a diagram illustrating in further detail the simultaneous processing of min terms by the min term generator of FIG. 3.

Moreover, the min terms M1 ... M8 are arranged within the associated templates 62a and/or 62b in a prescribed order that corresponds to the relative position of a data byte in the incoming data stream. As illustrated in FIG. 5, the min term M1 is configured for comparison with the first byte (B1) of the IP packet 32, the min term M2 is configured for comparison with a subsequent byte (B2) of the IP packet 32 that follows B1, the min term M3 is configured for comparison with a subsequent byte (B3) that follows B2, etc. Hence, the use of templates 62 having min terms in an order based on the relative position of a data byte in the incoming data stream enables multiple simultaneous comparisons between the incoming data stream and min terms. Hence, an incoming data packet can be compared to multiple templates to determine not only the data format of the incoming data packet, but also what action needs to be performed by the switch fabric 25.

Figure 7:
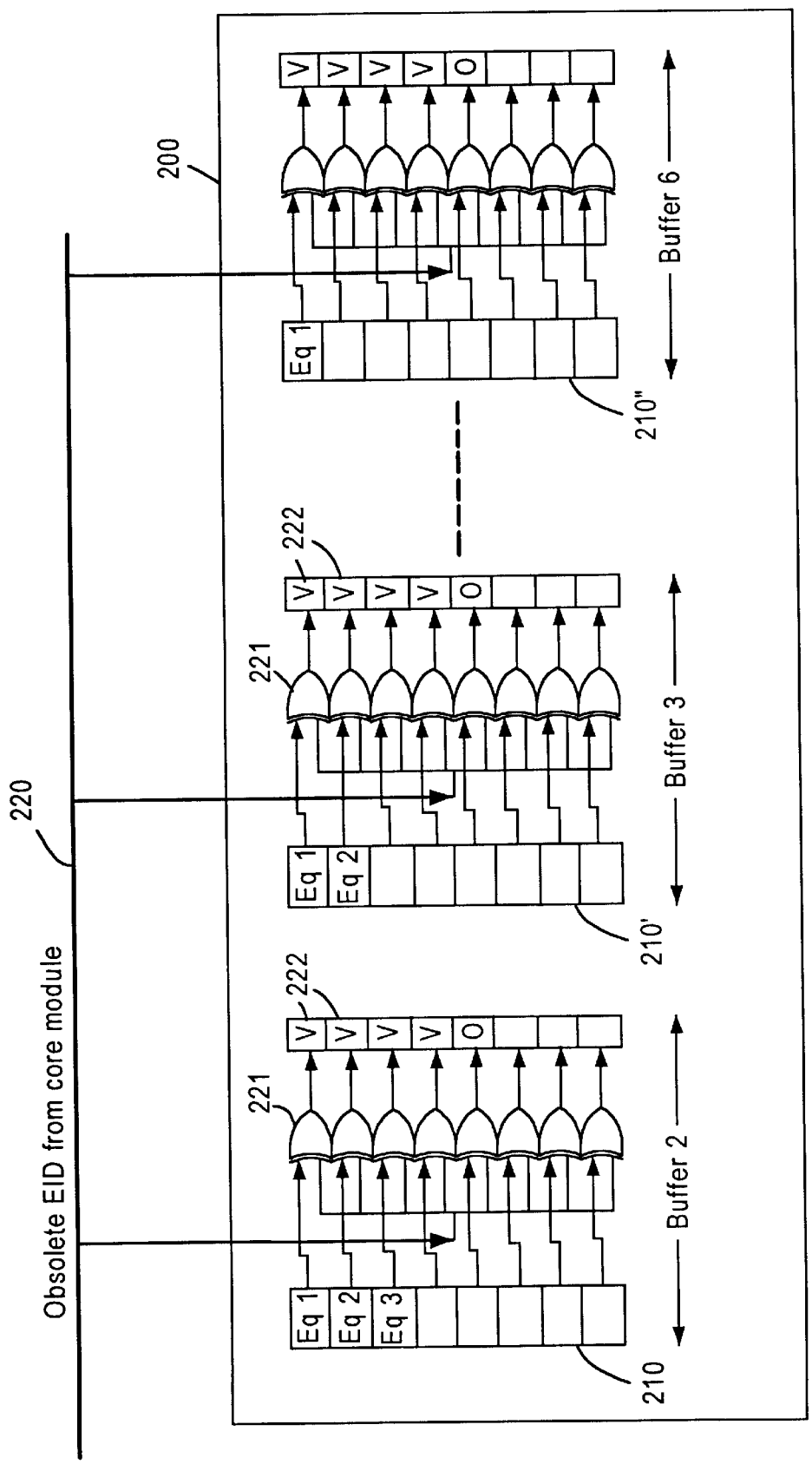
FIG. 7 is a diagram of the equation reduction module of FIG. 3.

As shown in FIG. 3, the packet classifier 24, also referred to as a network switch port filter, includes a min term memory 70. The min term memory 70 stores the min term values (e.g., M1, M2, etc.) as illustrated in FIG. 7, described below. The packet classifier 24 also includes a frame identifier 72 configured for identifying the type of layer 2 information being received. In particular, identifying the type of layer 2 information being received (e.g.., Ethernet, IEEE 802 to 3, etc.) enables identification of the start position 64 of the IP packet 32 within the layer 2 packet 30. The packet classifier 24 also includes a min term controller 74, a min term generator 76, an equation core 78, and an evaluation results memory 80. The min term controller 74 is configured for fetching the stored min terms from the min term memory 70 corresponding to a selected byte of the IP frame 32. The min term controller 74 also includes a location converter configured for specifying the actual byte location (byte_location) of the start point 64 in response to receiving a frame type (frm_type) signal from the frame identifier 72 that specifies the type of layer 2 information. Hence, the min term controller 74, in response to detecting the beginning of the IP packet, fetches all the min terms that are to be compared with the first byte (B1) of the IP packet 32, for example min terms M1, M9, and M14 for equations Eq1, Eq2, and Eq3 in FIG. 5. The min term controller 74 then forwards the min term values (M_STRU INFO) to the min term generator 76 and the equation core 78.

The min term generator 76 performs the actual min term comparisons between the min terms fetched by the min term controller and the selected byte of the incoming data stream. For example, the min term generator 76 simultaneously compares in FIG. 5 the incoming data byte B1 with the min terms M1, M9, and M14, and provides the min term comparison results (mt_result) to the equation core 78. During the next comparison cycle, the min term generator 76 simultaneously compares the incoming data byte B2 with the min terms M2, M10, and M15. According to the disclosed embodiment, the min term generator is configured for simultaneously comparing the incoming data stream to up to eight min terms.

The equation core 78 is configured for generating a frame tag based on the min term comparison results received from the min term generator 76, relative to the relevant templates 62. For example, the equation core 78 evaluates equation 1, illustrated in FIGS. 4A, 4B, by evaluating the min term results sequentially as the results are supplied from the min term generator. For example, if the comparisons for each of the min terms M1, M2, M3, M4, M5, and M6 result in a true condition, described below with respect to FIG. 6, then the end condition is matched in equation 1, causing the equation core 78 to generate a tag corresponding to the condition specified for equation 1. The frame tag identifies the nature of the incoming data packet, as well as the action that needs to be performed by the switch fabric 25.

Figure 6:
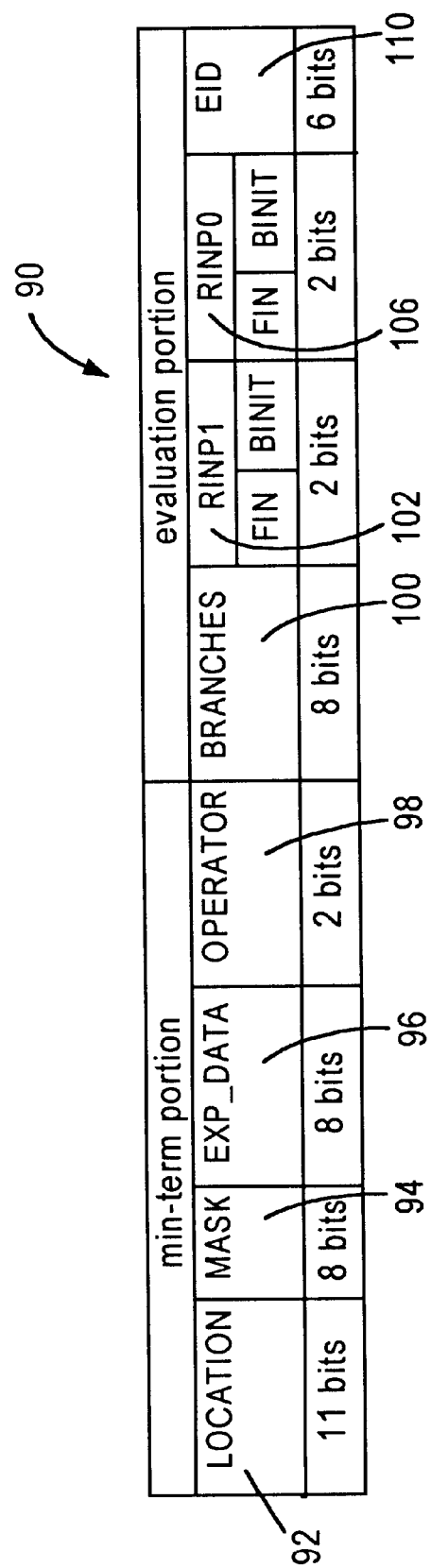
FIG. 6 is a diagram illustrating a table entry of a min term in the min term memory of FIG. 3.

FIG. 6 is a diagram illustrating the data format of the min term structure in the min term memory 70. According to the disclosed embodiment, the min terms are stored in the min term memory 70 in an order corresponding to the relative position of the data byte to be compared. Hence, all min terms that are to be compared to the first data byte are stored together in a first part of the min term memory, followed by min terms to be compared with the second data byte, etc.

Alternatively, the min terms may be stored in an order based on relevant information within the IP header, as well as the relative position of the data byte to be compared. Hence, the min terms may be stored in an order for comparing the sequence of data bytes providing the source IP address, destination IP address, and source and source and destination ports; in this case, non-relevant data bytes at the beginning of the IP frame would not have associated min terms stored at the beginning of the min term memory 70, further improving the efficiency of the min term memory 70.

Each table entry 90 includes a min term portion and an evaluation portion. The min term portion includes a location field (LOCATION) 92, a mask field (MASK) 94, an expected data field (EXP_DATA) 96, and an operator field (OPERATOR) 98. Based on the position of the table entry 90 in the min term memory 70, the min term controller 74 is able to determine which byte of the IP packet 32 that needs to be compared with the corresponding min term, relative to the beginning 64 of the IP packet. The mask field 94 is a mask that is used by the min term generator 76 in performing comparisons; if the mask has a bit set to 1, the value is compared, and if the mask value has zeros in the field, the comparison is a don't care. The expected data field 96 specifies the expected data to be compared with the relevant data byte of the IP packet 32. The operator field 98 specifies the type of comparison to be performed by the min term generator, for example: less than, less than or equal to, equal to, greater than, greater than or equal to, and not equal to.

The evaluation portion includes a branches portion 100, a response portion (RINP1) 102 for the case where the comparison of the min term portion is true, a second response portion (RINP0) 106 for the case where the comparison of the min term portion is false, and an equation identifier 110. The branches portion 100 specifies the order of the OR term in the equation; for example, the min term M1 as shown in FIGS. 4A, 4B and 5 would have its branches portion set to 0000 1111, indicating that the first four branches of the equation specified in the equation identifier field 110 are to include the corresponding min term. The use of eight bits for the branches portion assumes that there are a maximum of eight branches in any given equation.

The response portion 102 specifies the operation to be performed if the min term portion is evaluated as true relative to the compared data byte. In particular, the finish bit (FIN) is set to one if the results of the equation is determined if the min term result is true; the back to initial (BINIT) is set to one if the evaluation process should return to the initial state (init) if the min term result is true. For example, in the case of min term M1, the FIN bit and the BINIT bit of RINP1 are set to zero, since additional comparisons are needed if the min term result is true. In the case of min terms M5, M6, M7, and M8, the FIN bit of RINP1 is set to one, since a comparison result of "true" results in the end of the evaluation, as shown in FIGS. 4A, 4B.

The response portion 106 specifies the operation to be performed if the min term portion is evaluated as false relative to the compared data byte. In particular, the finish bit (FIN) is set to one if the results of the equation is determined if the min term result is false; the back to initial (BINIT) is set to one if the evaluation process should return to the initial state (init) if the min term result is false. For example, in the case of min term M1, the FIN bit is set to zero and the BINIT bit of RINP1 is set to one, such that the equation would return to the INIT state if the min term result M1 was false, as shown in FIGS. 4A, 4B.

The equation identifier field 110 identifies the equation (or template if there is only one template in an equation) that the min term corresponds to.

Hence, the equation core 78 determines whether any specified equation has a template 62 that matches the incoming data stream. Based on the multiple simultaneous comparisons of the incoming data stream with the multiple templates 62, the equation core 78 can identify a matching equation, and generate the appropriate tag corresponding to the matched equation for help it to the switching fabric 25. If desired, the core 78 by also output a command to the header modifier 29 to modify the layer 2 header, the layer 3 header, or both, before transferring the data to the switch.

In order to make the evaluation of the equations more efficient, with reference to FIGS. 3 and 7, an equation reduction module 200 is provided. The equation reduction module 200 is part of the packet classifier module 24 and includes a plurality of register arrays associated with each data byte. As shown, for example, register array 210 corresponds to the second data byte, register array 210' corresponds to the third data byte and register array 210" corresponds to the sixth data byte. More particularly, with respect to register array 210, the equation identifiers (EID) 110 of all min terms to be compared with the second data byte are grouped within the same column, and are identified as, e.g., Eq1, Eq2, Eq3 . . . With reference to FIG. 5, the second data byte includes min terms M2 for Eq1, M10 for Eq2 and M15 for Eq3. Thus, register array 210 includes the equation identifiers 110 for Eq1, Eq2 and Eq3 (FIG. 7). The third data byte contains min terms M3 and M11 corresponding to Eq1 and Eq2. Thus, register array 210' includes the equation identifiers 110 for EQ1 and Eq2. The sixth byte of FIG. 5 contains min terms M6 and M8 for Eq1. Thus, register array 210" includes the equation identifiers 110 for Eq1 only. Thus, it can be appreciated that there is a register array associated with each data byte containing the equation identifiers corresponding with the corresponding data byte. The equation identifiers 110 are stored in the registers of the register arrays as 6 bit digital values. For example, Eq1 has a digital value of 1, Eq3 has a digital value of 3, etc.

As noted above, the min term controller 74 fetches all min terms that are to be compared with the first byte of the IP packet 32. The min term controller 74 then forwards the min terms values to the min term generator 76 for comparison with the corresponding data byte, and forwards the results to the core 78. The core 78 evaluates the min term results and, if the core 78 determines that some of the equations are no longer necessary, the core 78 will send the equation identifier of the obsolete equation simultaneously to each register array 210, 210' . . . of the equation reduction module 200 via bus 220. At each register array 210, 210' . . . , logic in the form of an exclusive OR gate 221 is associated with each equation, e.g., Eq1, Eq2, and is used to determine whether the equation identifier at the register array 210, 210' . . . matches the equation identifier of the obsolete equation. If there is a match, a one bit output vector 222 is set to zero identifying an obsolete equation. If there is no match, the vector 222 is set to one, identifying a valid equation. Next, the min term controller reads 74 the vector 222 as a valid or obsolete equation and the controller 74 then forwards to the min term generator only the necessary min terms (min terms which still need to be compared) and forwards to the equation core 78 equations which still need to be evaluated. The vectors 222 will remain valid or obsolete until the next IP frame comes.

Thus, the invention identifies obsolete equations using simple logic. Furthermore, the register scheme of the invention may be applied to a system that is ultra sensitive to latency.

It can be seen that the invention advantageously provides an apparatus and method of discontinuing evaluation of equations as soon as the result of the equation is known. This saving of computation power increases the efficiency of the controller 74, enabling simultaneous comparisons of received frame data with multiple templates. Hence, evaluation of data frames can be completed before the frame data needs to be transferred from the network switch port.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method of evaluating an incoming data packet at a network switch port, the method comprising:

storing a plurality of templates for equations configured for identifying respective data formats, each template having at least one min term configured for comparing a corresponding prescribed value to a corresponding selected byte of the incoming data packet, simultaneously comparing, to the selected byte, min terms that correspond to the selected byte as the selected byte is received by the network switch port, identifying an obsolete equation which needs no further evaluation based on a comparison of the min terms with the selected byte, storing, in a register array corresponding with each byte, equation identifier information corresponding to min terms which are necessary to be compared with a corresponding byte, comparing the equation identifier of the obsolete equation with the equation identifier information in each register array, and based on the comparison, identifying equations which need no further evaluation.

2. The method of claim 1, wherein the simultaneously comparing step includes:

loading the min terms corresponding to a first of the data bytes into a min term generator;

comparing in parallel the min terms loaded in the min term generator with the first of the data bytes; and outputting comparison results for the min terms loaded in the min term generator to an equation core, and wherein the step of identifying an obsolete equation occurs at the equation core and the equation core sends the equation identifier of the obsolete equation simultaneously to each register array.

3. The method of claim 1, further comprising:

generating a comparison result that identifies the incoming data packet, and outputting a frame tag to a switch fabric configured for selectively switching the incoming data packet based on the corresponding frame tag.

4. The method according to claim 1, wherein the step of identifying equations which need no further evaluation includes setting an output vector which identifies equations which need no further evaluation as obsolete equations and identifies equations which require further evaluation as valid equations.

5. The method according to claim 4, further comprising:

reading the output vector, and based on the output vector, performing the comparing step by comparing only necessary min terms.

6. The method according to claim 1, wherein the data packet has an Internet Protocol (IP) format.

7. The method according to claim 1, wherein the step of comparing the equation identifier of the obsolete equation includes using an exclusive OR gate.

8. A network switch port filter configured for evaluating an incoming data packet, comprising:

a min term memory configured for storing min term values, each min term value being stored based on a location of a corresponding selected byte of the incoming data packet for comparison, each min term being stored as a table entry having an expression portion specifying a corresponding comparison operation and a template identifier field that specifies templates that use the corresponding min term, the template identifier field including an equation identifier;

a min term generator configured for simultaneously comparing a received byte of the incoming data packet with the min terms that correspond to the received byte and generating respective min term comparison results;

an equation core configured for evaluating equations and generating a frame tag identifying the incoming data packet based on the min term comparison results relative to the templates, the equation core being configured to identify equations which are no longer relevant, a equation reduction module including a plurality of register arrays, each register array including equation identifiers corresponding to the corresponding byte, the equation reduction module including logic configured to compare the equation identifiers of equations which are no longer relevant to equation identifiers in the register arrays and based on the comparison, to set output vectors, and a min term controller configured to read the output vectors and based thereon, to send necessary min terms to the min term generator.

9. The filter according to claim 8, wherein the min term controller is configured for fetching the min terms from the min term memory corresponding to a selected byte of the IP frame within the incoming data packet.

10. The filter according to claim 8, wherein the logic includes exclusive OR gates.

11. The filter according to claim 8, wherein the vectors identify equations which need no further evaluation as obsolete equations and identifies equations which require further evaluation as valid equations using one bit.

12. The filter according to claim 8, further comprising a frame identifier configured for identifying a type of layer 2 packet, the selected byte of the incoming data packet is determined based on the identified type of layer 2 packet.

13. The filter according to claim 12, wherein the location of each stored min term value is relative to a beginning of an IP frame within the layer 2 packet.

14. The filter according to claim 12, wherein the equation core generates the frame tag at a wire rate of the incoming data packet and prior to an end of the incoming data packet.

* * * * *